E. CARLSON.
BRAKE OPERATED STOP SIGNAL SWITCH FOR AUTOMOBILES.
APPLICATION FILED MAR. 8, 1917.
1,261,698.
Patented Apr. 2, 1918.
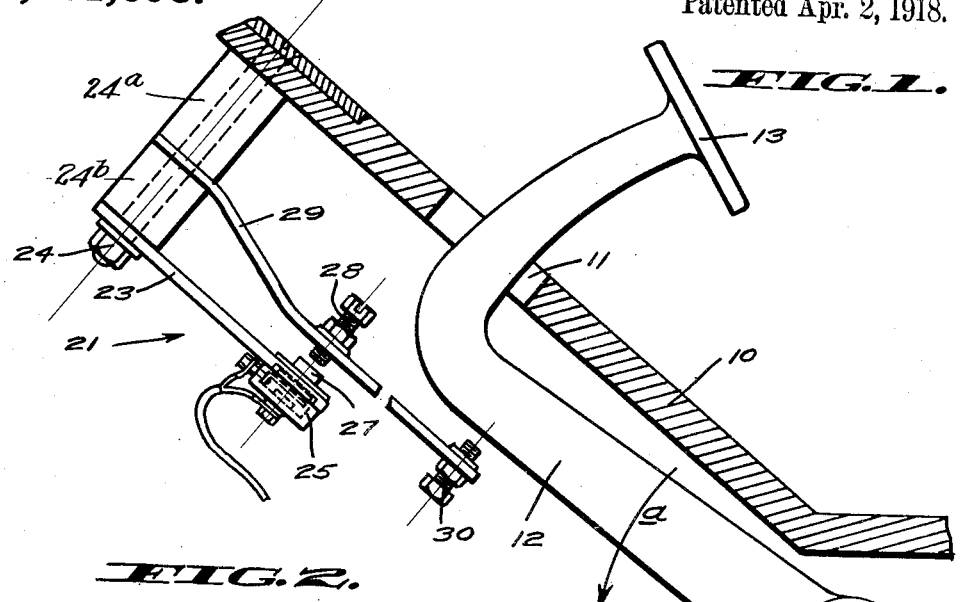
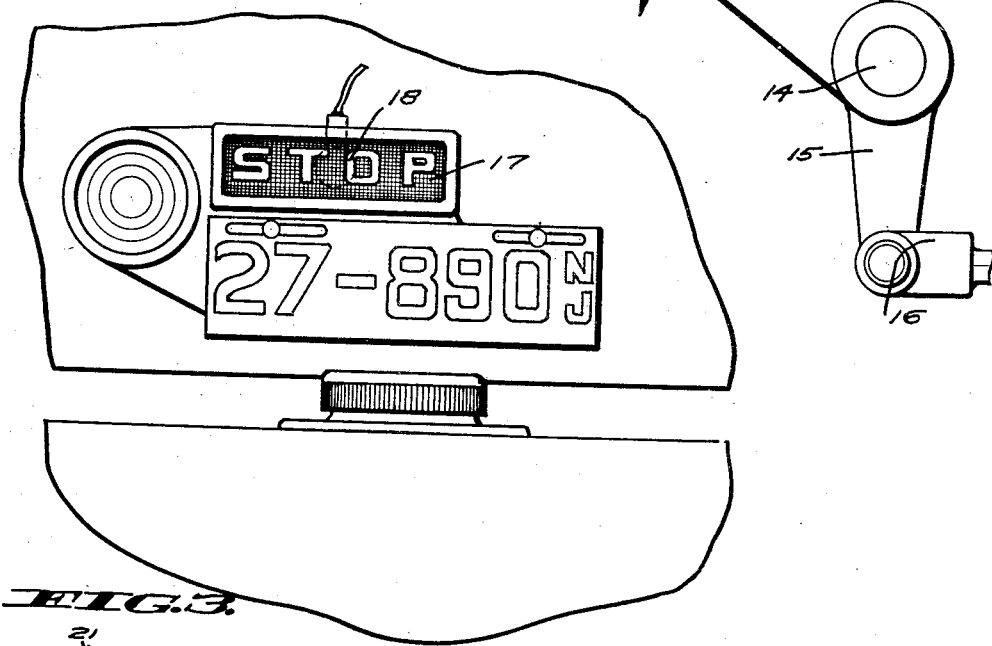
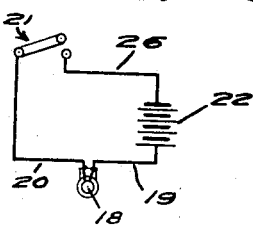
INVENTOR
EMIL CARLSON
BY Hazard & Miller
ATTYS

UNITED STATES PATENT OFFICE.

EMIL CARLSON, OF PASADENA, CALIFORNIA.

BRAKE-OPERATED STOP-SIGNAL SWITCH FOR AUTOMOBILES.

1,261,698.  Specification of Letters Patent.  Patented Apr. 2, 1918.

Application filed March 8, 1917. Serial No. 153,330.

*To all whom it may concern:*

Be it known that I, EMIL CARLSON, a citizen of the United States, residing at Pasadena, in the county of Los Angeles and State of California, have invented new and useful Improvements in Brake-Operated Stop-Signal Switches for Automobiles, of which the following is a specification.

This invention relates to a signal switch and particularly pertains to means for operating a signal semaphore upon motor vehicles.

It is the principal object of this invention to provide a switch operating means actuated by the movement of a motor vehicle brake pedal to indicate that the vehicle intends to slow down or come to a stop.

Another object of this invention is to provide a switch forming a simple signal apparatus which may be mounted beneath the floor of a motor vehicle without alteration of existing parts and which may be adjustably disposed in relation to the brake foot pedal and actuated thereby.

Another object of this invention is to provide a switch forming a signal operating device which will not interfere with the movement of the brake foot pedal and which also is constructed in a manner to accommodate the vibration of the pedal without actuating the signal semaphore.

It is a further object of this invention to provide a semaphore actuating mechanism consisting of a switch which is formed of few parts, inexpensive in their construction and which may be readily mounted upon a vehicle.

Other objects will appear hereinafter.

The invention is illustrated, by way of example, in the accompanying drawings in which:

Figure 1 is a view in vertical section and elevation illustrating a portion of the floor of a motor vehicle through which a brake pedal is positioned, and further disclosing the switch forming the semaphore actuating means positioned adjacent thereto.

Fig. 2 is a view in elevation illustrating a semaphore positioned at the rear of the car and adapted to be illuminated by the actuation of the switch mechanism.

Fig. 3 is a view in diagram disclosing the electric circuit by which the signal lamp is illuminated.

Referring more particularly to the drawings, 10 indicates the floor of a motor vehicle through which a pedal opening 11 is formed. A brake pedal 12 extends through this opening and is adapted to be depressed by the treadle portion 13. This pedal is formed with an arcuate shank which extends through the opening 11 and is integral with a radial body portion at an angle thereto. The end of this body portion is formed with a bearing by which it is mounted upon a brake shaft 14. A short brake lever 15 is secured to this shaft and adapted to rotate therewith. This lever is fitted with an actuating rod 16 suitably connected with the brake mechanism of the vehicle. It will be understood that the foregoing construction is not material and that the present invention relates to a signal device adapted to be actuated by the movement of the brake pedal.

The signal apparatus consists of an indicia screen 17. This screen is formed of a translucent plate upon which transparent letters are formed. The letters here shown spell the word "Stop" and are adapted to be illuminated by a lamp 18. This lamp is electrically connected by conductors 19 and 20 to the pedal actuated mechanism 21 and an electric battery 22. The mechanism 21 comprises a bracket 23 secured by a bolt 24 beneath the floor of the vehicle. The bolt 24 extends through spacing sleeves 24$^a$ and 24$^b$. This bracket 23 extends downwardly and parallel to the floor and supports a push button switch 25 to which the conductor 20 from the lamp and conductor 26 from the battery lead. This switch has a push button 27 which extends upwardly and is adapted to be depressed by a screw 28 adjustably held by a resilient finger 29. This finger is also secured to the vehicle by being placed between the spacing sleeves 24$^a$ and 24$^b$ upon the bolt 24. A contact extension is formed upon this finger and adapted to terminate beneath the radial portion of the pedal 12. An adjusting screw 30 is positioned within the end of the finger and extends upwardly in a manner to be engaged by the pedal as it is depressed.

In operation, the electric circuit controlling the lamp 18 is normally opened and the indicia screen 17 will therefore appear unilluminated. The adjusting screw 28 will also stand a distance from the push button 27, and the screw 30 will stand a distance from the lower face of the pedal 12. When the operator of the vehicle desires to retard the movement of the car or bring it to a stop, the brake pedal is depressed and will swing downwardly in the direction of the arrow —a—. After moving a short distance, the pedal will contact with the adjusting screw 30 which will cause the resilient finger 29 to swing downwardly and the adjusting screw 28 to be brought into engagement with the push button 27 of the switch 25. As the push button 27 is depressed the switch will establish communication between conductors 20 and 26 and complete an electric circuit through conductor 26 to the battery 22, from thence along conductor 19 to the incandescent light globe 18, the current then traveling along the conductor 20 to the switch. When the circuit is completed through the lamp 18 the screen 17 will be illuminated in a manner to render the letters thereon legible. Thus the pedestrians following the vehicle will be visually warned of the intention of the driver to slow down or stop his machine.

It will thus be seen that the invention here disclosed is simple in its construction and that it will act effectively in combination with the braking movement of the foot pedal.

While I have shown the preferred construction of my switch for operating a signal device as now known to me, it will be understood that various changes in the combination, construction and arrangement of parts may be made by those skilled in the art without departing from the spirit of the invention. I have shown my stop signal mechanism as operated by the foot brake of the vehicle. It will be understood, however, that the invention is applicable also when the switch controlling the signal is actuated by the clutch lever when the same is moved into clutch-releasing position, or the switch may be controlled by the throttle-operating mechanism when the latter is actuated to move the throttle into closed position.

I claim:

1. The combination with the foot-board and pedal of an automobile, of a bolt inserted downwardly through the foot-board, a spacing sleeve upon the bolt, a spring finger upon the bolt against the lower end of the spacing sleeve, a second spacing sleeve upon the bolt against the spring finger, a bracket upon the bolt against the lower end of the second spacing sleeve, a nut upon the bolt holding the parts tightly together, a push-button switch upon the end of the bracket, an adjusting screw carried by the spring finger in position to engage the push-button of the push-button switch, and a second adjusting screw carried by the spring finger in position to be engaged by the pedal.

2. The combination with a foot-board and pedal of an automobile, of a spring finger secured beneath the board and spaced therefrom, a bracket secured to the foot-board in spaced relation to and beneath the spring finger, and a push-button switch fixed to the end of the bracket; whereby engagement of the spring finger by the foot-pedal upon its downward travel will force the spring finger down upon the push-button and complete an electric circuit therethrough.

In testimony whereof I have signed my name to this specification.

EMIL CARLSON.